US008834811B2

(12) United States Patent
Chung et al.

(10) Patent No.: US 8,834,811 B2
(45) Date of Patent: Sep. 16, 2014

(54) DEVICE FOR STORING REAGENT AND METHOD OF DISCHARGING REAGENT THEREOF

(75) Inventors: Kwang Hyo Chung, Daejeon (KR); Yo Han Choi, Daejeon (KR); Jong Heon Yang, Daejeon (KR); Chan Woo Park, Daejeon (KR); Chil Seong Ah, Daejeon (KR); Wan Joong Kim, Goyang (KR); Gun Yong Sung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 88 days.

(21) Appl. No.: 13/528,777

(22) Filed: Jun. 20, 2012

(65) Prior Publication Data

US 2013/0149216 A1 Jun. 13, 2013

(30) Foreign Application Priority Data

Dec. 7, 2011 (KR) ........................ 10-2011-0130568

(51) Int. Cl.
*B01L 3/00* (2006.01)
*B01J 19/00* (2006.01)
*F04B 19/00* (2006.01)

(52) U.S. Cl.
USPC .............................. 422/505; 422/502; 422/41

(58) Field of Classification Search
USPC .................................................... 422/505, 41
See application file for complete search history.

(56) References Cited

U.S. PATENT DOCUMENTS

| | | | | |
|---|---|---|---|---|
| 2003/0197139 | A1* | 10/2003 | Williams | 251/7 |
| 2004/0056048 | A1* | 3/2004 | Kaartinen | 222/214 |
| 2006/0245933 | A1* | 11/2006 | Balch et al. | 417/182 |
| 2008/0142113 | A1 | 6/2008 | Kiani et al. | |

OTHER PUBLICATIONS

Ling Xie et al., "Design, Integration and Testing of Fluidic Dispensing Control Valve into a DNA/RNA Sample Preparation Micro fluidic Package for Lab on a Chip (LOC) Applications", 2007 Electronic Components and Technology Conference, May 29-Jun. 1, 2007, pp. 1900-1904, IEEE.

* cited by examiner

*Primary Examiner* — Jill Warden
*Assistant Examiner* — Brittany Fisher

(57) ABSTRACT

Provided are a device for storing a reagent capable of being adhered to a biochip and supplying the stored reagent to the biochip, and a method of discharging a reagent thereof. The device for storing a reagent includes an elastic film pressurizing part configured to pressurize an elastic film by magnetic force, and a reagent discharging part configured to store the reagent and discharge the reagent through an outlet by using the deformation in the elastic film due to the pressurization. According to the present invention, a magnetic force controlling device can be small-sized and the reagent can be automatically, high-precisely, and reproducibly supplied through the magnetic force control.

10 Claims, 8 Drawing Sheets

DEVICE FOR STORING REAGENT AND METHOD OF DISCHARGING REAGENT THEREOF

CROSS-REFERENCE TO RELATED APPLICATIONS

This application claims priority to and the benefit of Korean Patent Application No. 10-2011-0130568 filed in the Korean Intellectual Property Office on Dec. 7, 2011, the entire contents of which are incorporated herein by reference.

TECHNICAL FIELD

The present invention relates to a device for storing a reagent and a method of discharging a reagent thereof. More particularly, the present invention relates to a device for storing a reagent capable of being adhered to a biochip and supplying the stored reagent to the biochip, and a method of discharging a reagent thereof.

BACKGROUND ART

Biochips for diagnosing and analyzing bio-samples easily and rapidly have been developed. In the biochips, a method of injecting only the bio-samples and a method of injecting various reagents in sequence are used. The former method has a simple form, but may not be applied to diagnosis and analysis requiring a complicated biochemical reaction. The latter method can perform the complicated reaction to apply various analysis protocols, but additionally requires a complicated driving device for storing and supplying the reagents.

In recent trends of the development of biochips, the development of highly functional biochips having high sensitivity, quantification, reproducibility, simultaneously various analyses, and the like has been required and become mainstream. A lab-on-a-chip type biochip which sequentially performs preprocessing, analysis, and measurement of the sample in one chip has been developed. As described above, in order to develop a highly functional lab-on-a-chip type biochip, reproducible implementation of the complicated reaction protocol is required and may be performed by sequential, quantified, and automated supply of the reagent.

Until now, in most lab-on-a-chips, a method has been used, in which necessary reagents are stored outside and supplied to the lab-on-a-chips by an external pumping device. The aforementioned storing and supplying method of the reagents has a problem in that the external device becomes complicated and enlarged. In order to remove the external pumping device, a type in which a micro pump is installed on the lab-on-a-chip has been developed, but there are problems in that a complicated process and additional costs for installing the micro pump on the chip are required and integration of the micro pump on the chip with other elements is difficult, and there is a problem in that the reagent cannot be stored.

In order to solve the problems, several techniques of storing a reagent on a lab-on-a-chip in the related art are proposed. One method is a method in which a chamber for storing a reagent is installed on a chip and sealed after injecting the reagent therein. In this case, an inlet of the reagent and a minute passage connected with the storing chamber need to be sealed, which is mainly implemented by a micro valve or a phase change material. However, process and control operation for opening and closing the minute passage is a little complicated. Another method is a method in which a pouch type reagent storage is adhered on a chip. In this case, by pressurizing the pouch manually or by a mechanical apparatus, reproducibility of flow may be lowered when supplying the reagent, and an additional mechanical control is required.

As described above, in order to store the reagent, homeostatic maintenance of the storage liquid, low-priced implementation, a simple operation, a reproducible supply of the reagent, and the like are required. However, in the related art, there is a limit in satisfying the required conditions.

SUMMARY OF THE INVENTION

The present invention has been made in an effort to provide a device for storing a reagent which supplies the stored reagent to a biochip by using magnetic force and elastic force and a method of discharging a reagent thereof.

An exemplary embodiment of the present invention provides a device for storing a reagent, including: an elastic film pressurizing part configured to pressurize an elastic film by magnetic force; and a reagent discharging part configured to store the reagent and discharge the reagent through an outlet by using the deformation in the elastic film due to the pressurization.

The device for storing a reagent may be adhered to one side of the biochip, and the elastic film pressurizing part may generate the magnetic force by a magnetic force generating device disposed on the other side of the biochip.

The elastic film pressurizing part may be formed in any one shape of a conic shape, a tack shape, a spherical shape, and a minute spherical shape according to a magnitude of the magnetic force or a discharging speed of the reagent.

The device for storing a reagent may further include the elastic film formed between the elastic film pressurizing part and the reagent discharging part, and curvedly formed or adhesively formed without the curve.

The elastic film may be made of at least one component of latex rubber, styrene butadiene rubber (SBR), acrylonitrile butadiene rubber (NBR), nitrile rubber (NR), polychloroprene, butyl rubber, ethylene propylene (EP) rubber, thiokol rubber, silicon rubber, fluoro rubber, acryl rubber, fluorosilicon rubber, polydimethylsiloxane (PDMS), and a plastic film.

The device for storing a reagent may further include an adhesive part having adhesion and formed around the outlet, in which the outlet may be adhered to a reagent transfer path of the biochip by the adhesive part.

The device for storing a reagent may further include: a first cover configured to cover the reagent discharging part so as to support the reagent discharging part; a second cover configured to mount the elastic film pressurizing part in an empty inner space and integrally formed with the first cover with the elastic film therebetween; and a protective film configured to protect the adhesive part so as not to lose the adhesion of the adhesive part.

The inner space of the second cover may be formed wider than the elastic film pressurizing part or charged with a lubricant. The protective film may be removed when the device for storing a reagent is adhered to the biochip.

The reagent discharging part may be formed in any one shape of a conic shape, a polyhedral shape, and a hemispherical shape according to the shape of the elastic film pressurizing part.

Another exemplary embodiment of the present invention provides a method of discharging a reagent of a device for storing the reagent, including: pressurizing an elastic film by magnetic force; and discharging a stored reagent through an outlet by using the deformation in the elastic film due to the pressurization.

The device for storing a reagent and a magnetic force generating device may be provided at both sides of the biochip, respectively, and in the pressurizing of the elastic film, the magnetic force may be generated by the magnetic force generating device.

According to the exemplary embodiments of the present invention, the following effects may be acquired by supplying a stored reagent to a biochip by using magnetic force and elastic force. First, the device for storing a reagent can be easily fabricated with a low-priced material and may be used only once. Second, the device for storing a reagent can be adhered regardless of material and shape of the biochip and thus has generality. Third, a reagent storing container is easily sealed to store the reagent for a long time. Fourth, in the case where the magnetic force generating device provided outside is implemented by an electromagnet, the control can be electrically preformed, and thus a control device can be small-sized. Fifth, the reagent can be automatically, high-precisely, and reproducibly supplied through the magnetic force control. Sixth, the device for storing a reagent is implemented in an array form to simultaneously and sequentially supply various kinds of reagents and thus can be applied as a mixer.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
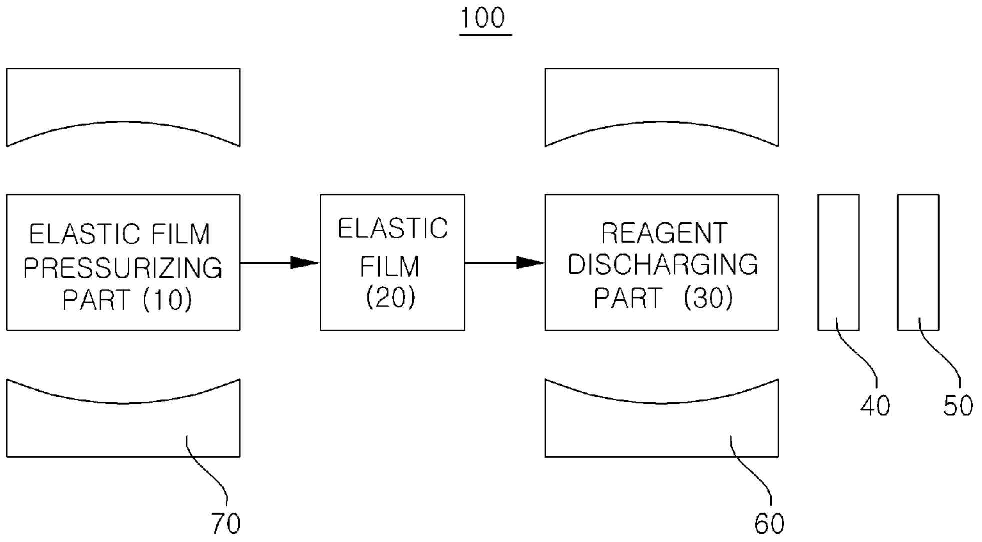
FIG. 1 is a block diagram schematically illustrating a device for storing a reagent according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. In describing the present invention, well-known functions or constructions will not be described in detail since they may unnecessarily obscure the understanding of the present invention. It should be understood that although exemplary embodiment of the present invention are described hereafter, the spirit of the present invention is not limited thereto and may be changed and modified in various ways by those skilled in the art.

FIG. 1 is a block diagram schematically illustrating a device for storing a reagent according to an exemplary embodiment of the present invention. Referring to FIG. 1, a device 100 for storing a reagent includes an elastic film pressurizing part 10, an elastic film 20, and a reagent discharging part 30.

The elastic film pressurizing part 10 serves to pressurize the elastic film 20 by magnetic force. The device 100 for storing a reagent is adhered to one side of a biochip, and a magnetic force generating device is disposed on the other side of the biochip. The elastic film pressurizing part 10 generates the magnetic force by the magnetic force generating device to pressurize the elastic film 20. The biochip means a biochip using a method of injecting various reagents in sequence. For example, the biochip may be a lab-on-a-chip type biochip. The elastic film pressurizing part 10 may be formed in any one shape of a conic shape, a tack shape, a spherical shape, and a minute spherical shape according to a magnitude of the magnetic force or a discharging speed of the reagent. This will be described below in more detail with reference to FIGS. 3A and 3D.

The reagent discharging part 30 serves to store the reagent and discharge the reagent through an outlet by using the deformation in the elastic film caused by the pressurization. The reagent discharging part 30 may be formed in any one shape of a conic shape, a polyhedral shape, and a hemispherical shape according to the shape of the elastic film pressurizing part 10.

The elastic film 20 is formed between the elastic film pressurizing part 10 and the reagent discharging part 30, and is curvedly formed or adhesively formed without the curve. The elastic film 20 may be made of at least one component of latex rubber, styrene butadiene rubber (SBR), acrylonitrile butadiene rubber (NBR), nitrile rubber (NR), polychloroprene, butyl rubber, ethylene propylene (EP) rubber, thiokol rubber, silicon rubber, flouro rubber, acryl rubber, fluorosilicon rubber, polydimethylsiloxane (PDMS), and a plastic film.

The device 100 for storing a reagent may further include an adhesive part 40. The adhesive part 40 has adhesion and is formed around the outlet. In this case, in the device 100 for storing a reagent, the outlet may be adhered to a reagent transferring path of the biochip by the adhesive part 40.

The device 100 for storing a reagent may further include a first cover 60, a second cover 70, and a protective film 50. The first cover 60 serves to cover the reagent discharging part 30 so as to support the reagent discharging part 30. The second cover 70 mounts the elastic film pressurizing part 10 in the inner empty space and is integrally formed together with the first cover 60 with the elastic film 20 therebetween. The inner space of the second cover 70 may be formed larger than the elastic film pressurizing part 10. In this case, a lubricant may be charged in the inner space of the second cover 70. The protective film 50 serves to protect the adhesive part 40 so as not to lose the adhesion of the adhesive part 40. The protective film 50 is removed when the device 100 for storing a reagent 100 is adhered to the biochip.

Figure 2:
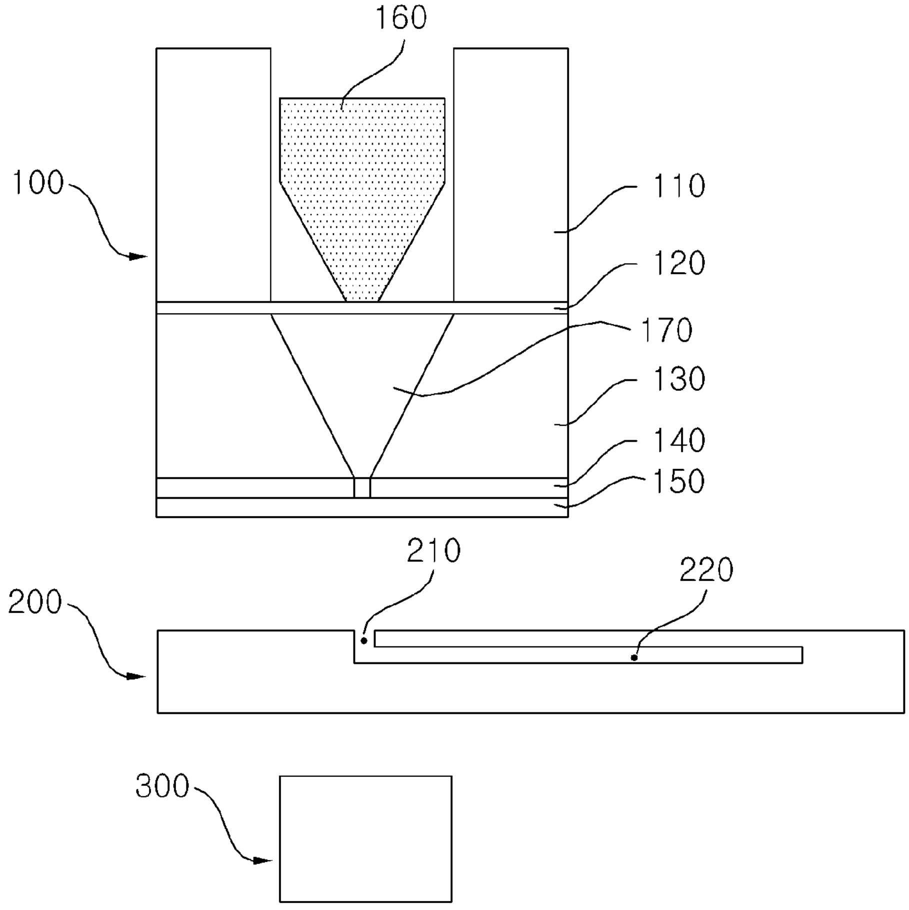
FIG. 2 is a diagram for explaining a structure and an operation of a device for storing a reagent according to an exemplary embodiment of the present invention.
Figure 3A:
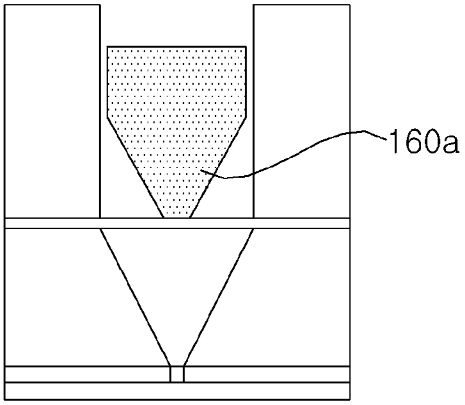
FIGS. 3A, 3B, 3C and 3D are an exemplified diagram of a magnetic number part shown in FIG. 2.
Figure 3B:
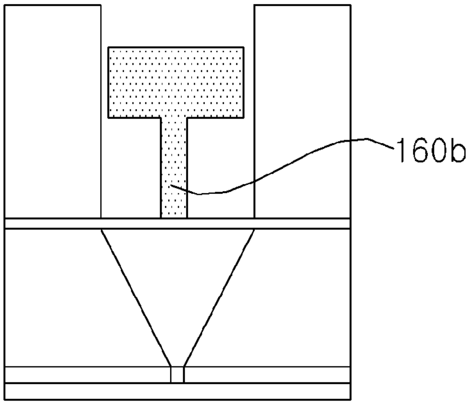
Figure 3C:
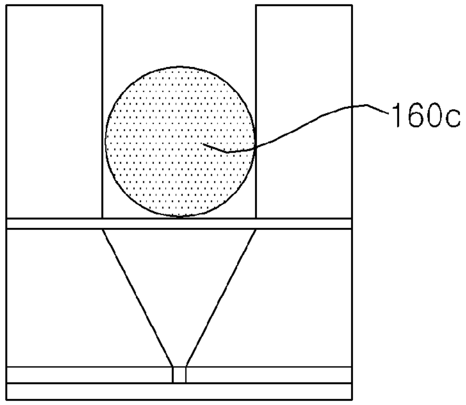
Figure 3D:
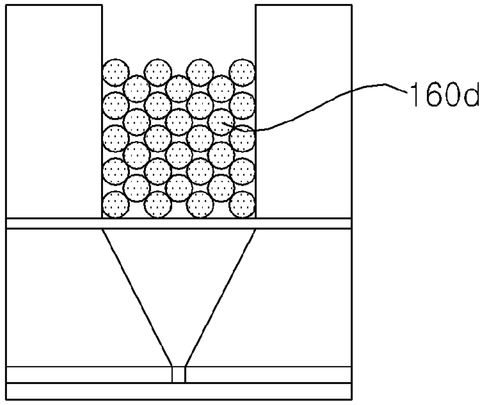
Figure 4A:
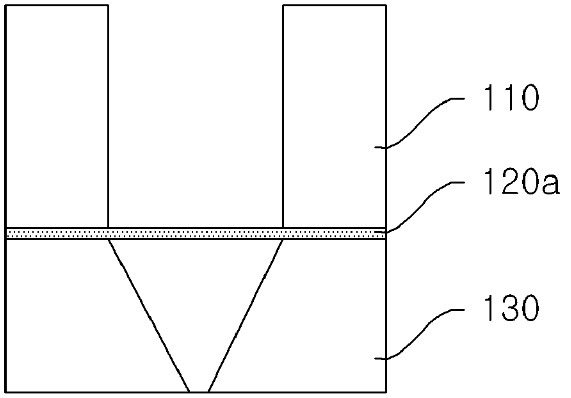
FIGS. 4A, 4B, 4C and 4D are an exemplified diagram of an elastic film shown in FIG. 2.
Figure 4B:
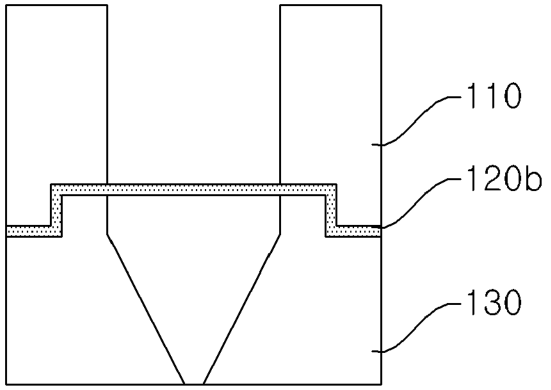
Figure 4C:
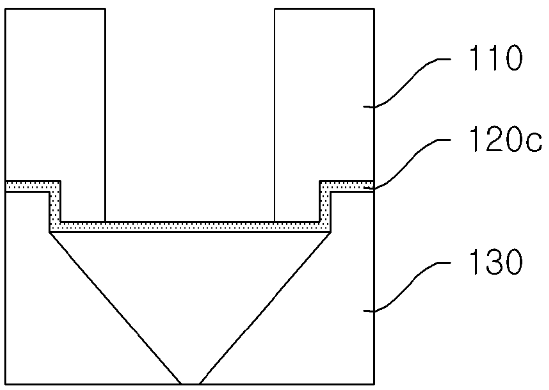
Figure 4D:
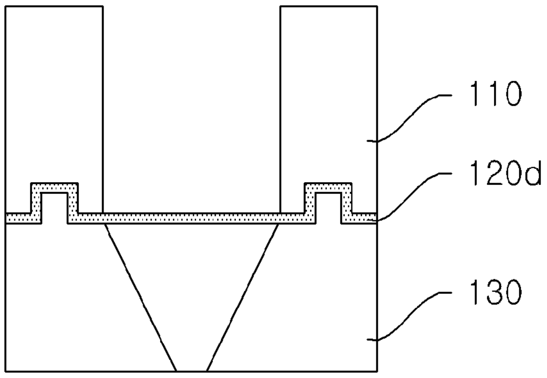
Figure 5A:
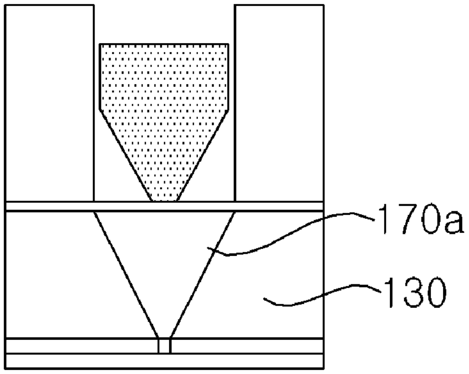
FIGS. 5A, 5B and 5C are an exemplified diagram of a reagent storing container shown in FIG. 2.
Figure 5B:
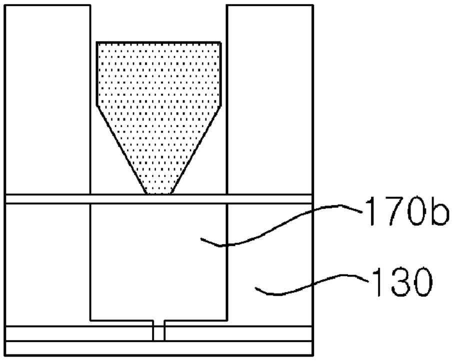
Figure 5C:
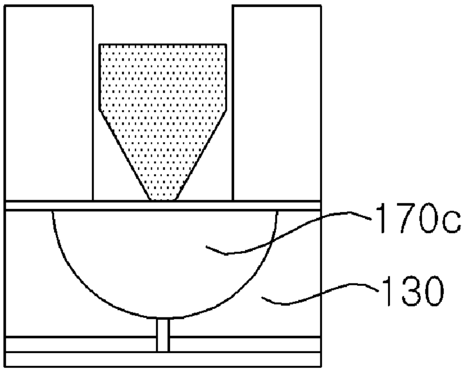

Next, a structure and an operation of the device for storing a reagent according to an exemplary embodiment of the present invention will be described. FIG. 2 is a diagram for explaining an operation and a cross-sectional structure of a device for storing a reagent according to an exemplary embodiment of the present invention. FIGS. 3A and 3D are an exemplified diagram of a magnetic number part shown in FIG. 2. FIGS. 4A and 4D are an exemplified diagram of an elastic film shown in FIG. 2. FIGS. 5A and 5C are an exemplified diagram of a reagent storing container shown in FIG. 2. Hereinafter, the description will be made with reference to FIGS. 2 to 5C.

The device for storing a reagent is a device for storing and supplying various reagents required for the biochip. The device for storing a reagent is a device for a biochip which may be adhered to the biochip, used only once, and driven by magnetic force.

As shown in FIG. 2, the device 100 for storing a reagent is adhered to the biochip 200 and includes a magnetic force generating device 300 outside for operation. The device 100 for storing a reagent is configured by an upper structure 110, an elastic film 120, a lower structure 130, an adhesive member 140, a protective film 150, and a magnetic number part 160.

The upper structure 110, the elastic film 120, and the lower structure 130 are adhered to each other to be integrated, and a reagent storing container 170 is mounted on the lower structure 130 and sealed with the elastic film 120, the adhesive member 140, and the protective film 150. The device 100 for storing a reagent and the biochip 200 are adhered to each other by the adhesive member 140 disposed on the lower surface of the device 100 for storing a reagent, the protective film 150 is removed during the adhering, and an outlet 180 of the device 100 for storing a reagent is arranged at an inlet 210 of the biochip 200. The magnetic force generating device 300 serves to move the magnetic number part 160 toward the outlet 180 of the device for storing a reagent by applying the magnetic force to the magnetic number part 160 of the device 100 for storing a reagent. The upper structure 110, the elastic film 120, the lower structure 130, the adhesive member 140, the protective film 150, the magnetic number part 160, and the reagent storing container 170 correspond to the second cover 70, the elastic film 20, the first cover 60, the adhesive part 40, the protective film 50, the elastic film pressurizing part 10, and the reagent discharging part 30, which are shown in FIG. 1.

An operation process of the device 100 for storing a reagent will be described as follows.

First, the device 100 for storing a reagent is adhered with the adhesive member 140 by removing the protective film 150 and arranging the outlet 180 and the inlet 210 of the biochip 200. The magnetic force generating device 300 applies attraction to the magnetic number part 160, and as a result, the elastic film 120 is elastically deformed to move in a direction of the lower structure 130. In this process, the reagent stored in the reagent storing container 170 is pushed toward the outlet 180. Thereafter, the reagent is transferred through the inlet 210 of the biochip and a micro channel 220 of the biochip 200. In order to control a transfer speed, the magnetic force generating device 300 may control the attraction applied to the magnetic number part 160.

Hereinafter, roles and features of the constituent elements will be described.

The magnetic number part 160 is formed of a magnetizable material in order to generate a predetermined magnitude of magnetic force by the magnetic force generating device 300. For example, the magnetic number part 160 may be fabricated by magnet, steel, and the like. In the case of using the magnet, a direction of the magnetic force may be determined so that the attraction may be applied by the magnetic force generating device 300 and thus the magnet may be inserted. The shape and material of the magnetic number part 160 may influence a magnitude of the magnetic force and an ejection flow speed of the reagent, and be deformed to various shapes and materials to be fabricated in order to smoothly eject the reagent. That is, the shapes may include a conic shape 160*a* of FIG. 3A, a tack shape 160*b* of FIG. 3B, a spherical shape 160*c* of FIG. 3C, a minute spherical shape 160*d* of FIG. 3D. The shape of the magnetic number part 160 may be deformed to be suitable for the shape of the reagent storing container 170 in which the reagent is stored and the shape of the upper structure 110 to which the magnetic number part 160 moves.

The magnetic force generating device 300 may be disposed to be close to the lower end of the biochip 200. The magnetic force generating device 300 may be formed by a permanent magnet or an electromagnet, and the magnitude of the magnetic force may be controlled to be suitable for the size, the material, and the spaced distance of the magnetic number part 160. In the case of forming the magnetic force generating device 300 by the permanent magnet, it is possible to control the ejection transfer speed of the reagent by controlling the spaced distance between the permanent magnet and the magnetic number part 160. In the case of forming the magnetic force generating device 300 by the electromagnet, it is possible to control a transfer speed and a gradient of the reagent through ON/OFF, linear, and nonlinear controls of the magnetic force. The reagent may be automatically, high-precisely, and reproducibly supplied through the aforementioned magnetic force control of the magnetic force generating device 300. A plurality of devices 100 for storing a reagent are arranged in an array form, and magnetic force generating devices 300 are configured to correspond to the plurality of devices 100 for storing a reagent, to thereby simultaneously and sequentially supply various kinds of reagents. As a result, the biochip 200 may be applied as a mixer of the various kinds of reagents. The storing and transferring of the reagent through the devices 100 for storing a reagent and the magnetic force generating devices 300 are simply controlled as compared with an existing method using a pump and a tube, such that a small-sized and low-priced main body may be implemented and thus the biochip 200 may be used on the spot. The device for storing a reagent may be controlled in a contactless way through the magnetic force and be used only once, and thus cross-contamination does not occur.

The elastic film 120 is installed between the upper structure 110 and the lower structure 130, and the adhesive member 140 and the protective film 150 are installed on the bottom of the lower structure. The reagent is stored in the reagent storing container 170 of the lower structure 130 and sealed by the elastic film 120, the adhesive member 140, and the protective film 150. In order to seal the reagent, the elastic film 120, the adhesive member 140, and the protective film 150 may be made of a leak-proof material. The elastic film 120 may be bonded to the upper and lower structures 110 and 130 with the adhesive or structurally bound to the upper and lower structures 110 and 130. FIGS. 4A and 4D exemplifies various methods in which the elastic film 120 is installed between the upper and lower structures 110 and 130. FIG. 4A shows an elastic film having a planar binding surface 120*a* which may be bonded to the upper and lower structures 110 and 130 with the adhesive, and FIGS. 4B, 4C, and 4D show elastic films having curved binding surfaces 120*b*, 120*c*, and 120*d* which may be bound to the upper and lower structures 110 and 130 without the adhesive. The elastic film 120 may be thinly formed without leakage and may be formed of an elastically deformable material. To this end, various rubbers such as latex rubber, styrene-butadiene rubber (SBR), acrylonitrile-butadiene rubber (NBR), nitrile rubber (NR), polychloroprene (chloroprene rubber), butyl rubber, EP rubber, thiokol rubber, silicon rubber, fluoro rubber, acryl rubber, fluorosilicon rubber, and the like, PDMS, a plastic film, and the like may be used. The adhesive member 140 may be formed as a double-sided tape or a sealing means having different adhesion so that the lower structure 130 is adhered to the biochip 200. The outlet 180 having a diameter corresponding to the lower structure 130 is formed at the center of the adhesive member 140. The protective film 150 may be easily attached to or detached from the double-sided tape and formed of a leak-proof material. The device 100 for storing a reagent may be fixed and used through the adhesive member 140 if the outlet 180 of the device 100 for storing a reagent and the inlet 210 of the biochip 200 may be arranged regardless of the size and material of the biochip 200 to be used regardless of the kind of biochip, and thus has generality.

The upper structure 110 and the lower structure 130 may be fabricated in various shapes and materials according to the amount and size of the reagent required by the biochip 200. The amount of the reagent may be controlled in the range of several μl to several hundred μl according to the biochip 200. The upper and lower structures 110 and 130 may be injection-molded with a plastic material for low-priced mass fabrication. Horizontal cross-sections of the inner spaces of the upper and lower structures 110 and 130 may also be formed in a circle and a polygon as necessary. The size of the inner space of the upper structure 110 may be formed a little larger than the size of the magnetic number part 160, and a lubricant may be charged in the inner space so that the magnetic number part 160 smoothly moves. FIGS. 5A and 5C exemplifies various shapes of reagent storing containers 170 and various shapes of inner spaces where the reagents are stored. A vertical cross-section of the reagent storing container 170 may be formed in a triangle 170*a* of FIG. 5A, a square 170*b* of FIG. 5B, a circle 170*c* of FIG. 5C, and the like, and may be variously deformed according to the stored amount of the reagent, the shape of the magnetic number part 160, the shape of the elastic film 120, and the like.

On the elastic film 120 contacted with the reagent and the wall of the inner space of the reagent storing container 170, surface treatment may be performed in order to store the reagent for a long time and maintain homeostasis. The surface treatment may include plasma treatment, chemical treatment, coating treatment, and the like.

Figure 6:
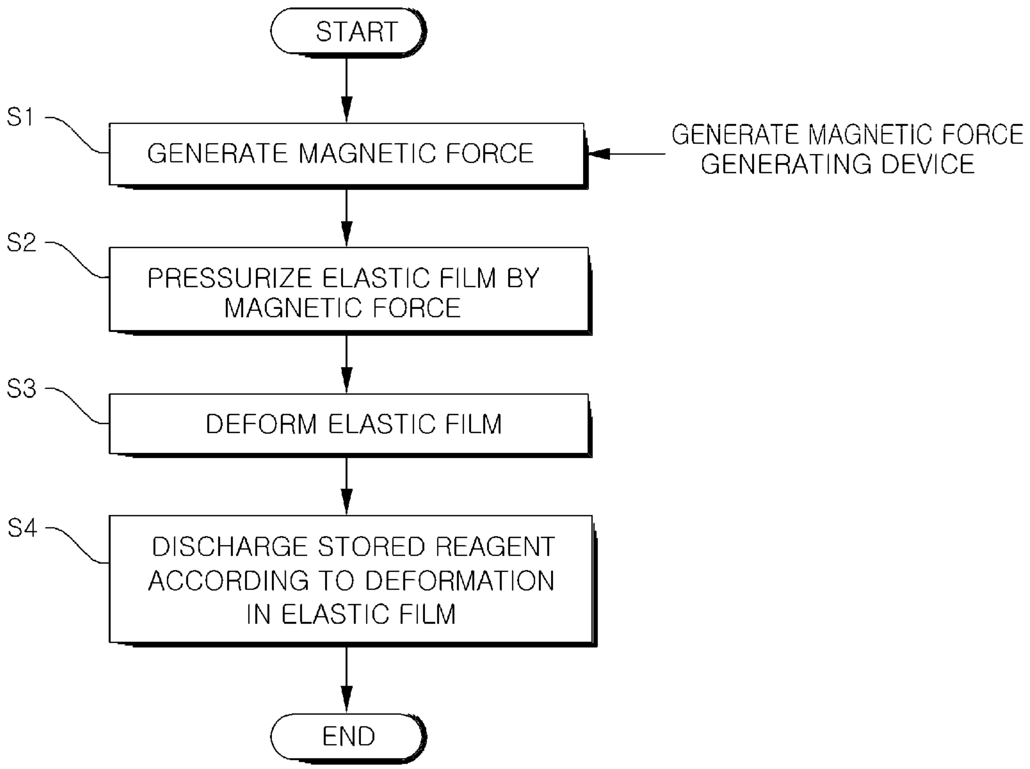
FIG. 6 is a flowchart schematically illustrating a method of discharging a reagent of the device for storing the reagent according to the exemplary embodiment of the present invention.

Next, a method of discharging a reagent of the device 100 for storing the reagent will be described. FIG. 6 is a flowchart schematically illustrating the method of discharging a reagent of the device for storing the reagent according to the exemplary embodiment of the present invention. The following description will be made with reference to FIG. 6.

First, the device 100 for storing a reagent pressurizes an elastic film by magnetic force (elastic film pressurizing step, S2). When the elastic film is deformed by the pressurization (S3), the device 100 for storing a reagent discharges the stored reagent through an outlet by using the deformation in the elastic film (reagent discharging step, S4).

Meanwhile, before elastic film pressurizing step S2, the magnetic force is generated in the device 100 for storing a reagent by a magnetic force generating device (S1). The device 100 for storing a reagent pressurizes the elastic film by the magnetic force. The magnetic force generating device is formed at the opposite side of the device 100 for storing a reagent with the biochip therebetween.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A device for storing a reagent, comprising:
an elastic film;
an elastic film pressurizing part configured to pressurize the elastic film using magnetic force; and
a reagent discharging part configured to store the reagent and discharge the reagent through an outlet by using the deformation in the elastic film due to the pressurization,
wherein the elastic film is disposed between the elastic film pressurizing part and the reagent discharging part, and
wherein the device for storing a reagent is adhered to one side of a biochip to which the reagent is supplied, and the magnetic force is generated by a magnetic force generating device disposed on the other side of the biochip.

2. The device for storing a reagent of claim 1, wherein the elastic film pressurizing part is formed in any one shape of a conic shape, a tack shape, a spherical shape, and a minute spherical shape according to a magnitude of the magnetic force or a discharging speed of the reagent.

3. The device for storing a reagent of claim 1,
wherein the elastic film is curvedly formed or adhesively formed without the curve.

4. The device for storing a reagent of claim 1, wherein the elastic film is made of at least one component of latex rubber, styrene butadiene rubber (SBR), acrylonitrile butadiene rubber (NBR), nitrile rubber (NR), polychloroprene, butyl rubber, ethylene propylene (EP) rubber, thiokol rubber, silicon rubber, fluoro rubber, acryl rubber, fluorosilicon rubber, polydimethylsiloxane (PDMS), and a plastic film.

5. The device for storing a reagent of claim 1, further comprising:
an adhesive part having adhesion and formed around the outlet,
wherein the outlet is adhered to a reagent transfer path of the biochip by the adhesive part.

6. The device for storing a reagent of claim 5, further comprising:
a first cover configured to cover the reagent discharging part so as to support the reagent discharging part;
a second cover configured to mount the elastic film pressurizing part in an empty inner space and integrally formed together with the first cover with the elastic film therebetween; and
a protective film configured to protect the adhesive part so as not to lose the adhesion of the adhesive part.

7. The device for storing a reagent of claim 6, wherein the inner space of the second cover is formed wider than the elastic film pressurizing part or charged with a lubricant.

8. The device for storing a reagent of claim 6, wherein the protective film is removed when the device for storing a reagent is adhered to the biochip.

9. The device for storing a reagent of claim 1, wherein the reagent discharging part is formed in any one shape of a conic shape, a polyhedral shape, and a hemispherical shape according to the shape of the elastic film pressurizing part.

10. A method of discharging a reagent of a device for storing the reagent, the method comprising:

pressurizing an elastic film by magnetic force; and discharging a stored reagent through an outlet by using the deformation in the elastic film due to the pressurization, wherein the device for storing the reagent and a magnetic force generating device are provided at both sides of a biochip to which the reagent is supplied, respectively, and in the pressurizing of the elastic film, the magnetic force is generated by the magnetic force generating device.

* * * * *